US010785320B2

(12) United States Patent
Pai et al.

(10) Patent No.: US 10,785,320 B2
(45) Date of Patent: *Sep. 22, 2020

(54) MANAGING OPERATION OF INSTANCES

(71) Applicant: Amazon Technologies, Inc., Seattle, WA (US)

(72) Inventors: Derek Solomon Pai, Seattle, WA (US); Richard Nel-Boland, Dublin (IE); Brian Dennehy, Dublin (IE); Mai-Lan Tomsen Bukovec, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/112,441

(22) Filed: Aug. 24, 2018

(65) Prior Publication Data

US 2018/0367622 A1 Dec. 20, 2018

Related U.S. Application Data

(63) Continuation of application No. 13/916,735, filed on Jun. 13, 2013, now Pat. No. 10,063,644.

(51) Int. Cl.
| | |
|---|---|
| *G06F 15/173* | (2006.01) |
| *H04L 29/08* | (2006.01) |
| *H04L 12/26* | (2006.01) |
| *G06F 9/455* | (2018.01) |
| *H04L 12/24* | (2006.01) |

(52) U.S. Cl.
CPC .......... *H04L 67/16* (2013.01); *G06F 9/45558* (2013.01); *H04L 41/0273* (2013.01); *H04L 43/0876* (2013.01); *H04L 43/16* (2013.01); *H04L 67/26* (2013.01); *G06F 2009/45591* (2013.01)

(58) Field of Classification Search
CPC ..... H04L 67/16; H04L 67/26; H04L 41/0273; H04L 43/0876; H04L 43/16; G06F 9/45558; G06F 2009/45591
USPC ........................................................ 709/224
See application file for complete search history.

(56) References Cited

U.S. PATENT DOCUMENTS

| | | |
|---|---|---|
| 8,898,763 B1 | 11/2014 | Mannepalli et al. |
| 2002/0012011 A1 | 1/2002 | Roytman et al. |
| 2008/0083037 A1 | 4/2008 | Kruse et al. |
| 2009/0037367 A1 | 2/2009 | Wein |
| 2009/0157797 A1 | 6/2009 | Chang et al. |
| 2009/0172671 A1 | 7/2009 | Bobak et al. |
| 2010/0250748 A1* | 9/2010 | Sivasubramanian ........ G06F 9/5016 709/226 |
| 2012/0284628 A1 | 11/2012 | Wong et al. |
| 2013/0007265 A1 | 1/2013 | Benedetti et al. |
| 2013/0060933 A1 | 3/2013 | Tung et al. |

(Continued)

*Primary Examiner* — Wing F Chan
*Assistant Examiner* — Joseph R Maniwang
(74) *Attorney, Agent, or Firm* — Davis Wright Tremaine LLP (57) ABSTRACT

Disclosed are various embodiments for an instance monitoring service. Instances are associated with alarm conditions indicating a deviation in the operational health of the instance. Upon an alarm condition being satisfied, a remedy operation may be applied to restore the operational health of the instance. A notification system may let customers know of satisfied alarms, and confirm or cancel remedy operations.

20 Claims, 5 Drawing Sheets

(56) References Cited

U.S. PATENT DOCUMENTS

2013/0091284 A1 4/2013 Rothschild
2013/0103841 A1 4/2013 Werth et al.

* cited by examiner

MANAGING OPERATION OF INSTANCES

CROSS REFERENCE TO RELATED APPLICATION

This application is a continuation of U.S. patent application Ser. No. 13/916,735, filed Jun. 13, 2013, now U.S. Pat. No. 10,063,644, entitled "MANAGING OPERATION OF INSTANCES," the disclosure of which is hereby incorporated herein in its entirety.

BACKGROUND

Instances may encounter operational difficulties during execution. Administrators or customers must then apply a remedial action to alleviate the operational difficulty. Manual intervention to remedy the operational difficulty delays recovery from the operational difficulty.

BRIEF DESCRIPTION OF THE DRAWINGS

Various techniques will be described with reference to the drawings, in which.

DETAILED DESCRIPTION

Computing service providers allow for customers to create and execute instances, such as instances of operating systems, in a computing environment. Typically, the computing resources of the computing environment are shared amongst many instances run on behalf of many customers. Additionally, the price paid to the service provider may be dependent on a number of executed instances and/or an amount of computing resources used by the instances. It is beneficial to the customer for all the instances to be operating at a level of operational health such that computing resources are not unnecessarily used or unneeded instances remain idle, thereby increasing customer costs. It is beneficial to the service provider to ensure that shared computing resources are allocated efficiently to ensure customer satisfaction and overall performance.

According to various embodiments of the present disclosure, an instance monitoring service maintains alarms for one or more customers. Among other things, an alarm can specify one or more metrics based conditions and one or more actions to take based on the conditions. For example, a customer may set an alarm condition that relates to instance idling, e.g., low CPU usage over a period of time, and an action such as "terminate instance." The instance monitoring service can then monitor the metrics related to the alarm and, if the condition is satisfied, e.g., low CPU usage over a period of time, the instance monitoring service can cause the instance to be terminated. As another example, an alarm related to stuck or malfunctioning instances can monitor metrics related to processing, disk access, or network usage and compare them to one or more threshold at a point in time or aggregated over time and initiate a remedial action in the event that the metrics indicate that the instance is stuck or malfunctioning.

The customer associated with the instance may be able to customize the criteria of the alarm conditions, which alarm conditions apply to which instances, and how remedial actions are taken when an alarm is triggered. For example, the customer may configure an alarm such that a remedial action is taken only after being confirmed by the customer. Other customization options may also be available. For example, customers may upload their own custom actions and workflows written in a programming language that the workflow engine will execute. For example, a custom action could be given a name and associated with a workflow written by the customer or other customers. In this embodiment, when the alarm condition occurs, the instance monitoring service can determine that the action is effected by a customer workflow and invoke the workflow engine. The workflow engine can launch a decider node that includes code for managing the workflow, which in turn can launch a worker node that includes logic for effecting the action.

In the following discussion, a general description of the system and its components is provided, followed by a discussion of the operation of the same. Although the following discussion is presented in the context of monitoring instances, it is understood that the instance monitoring service described below may be applied to other computational resources or services operated by the service provider, such as block level storage volumes, relational databases or other resources or services.

Figure 1:
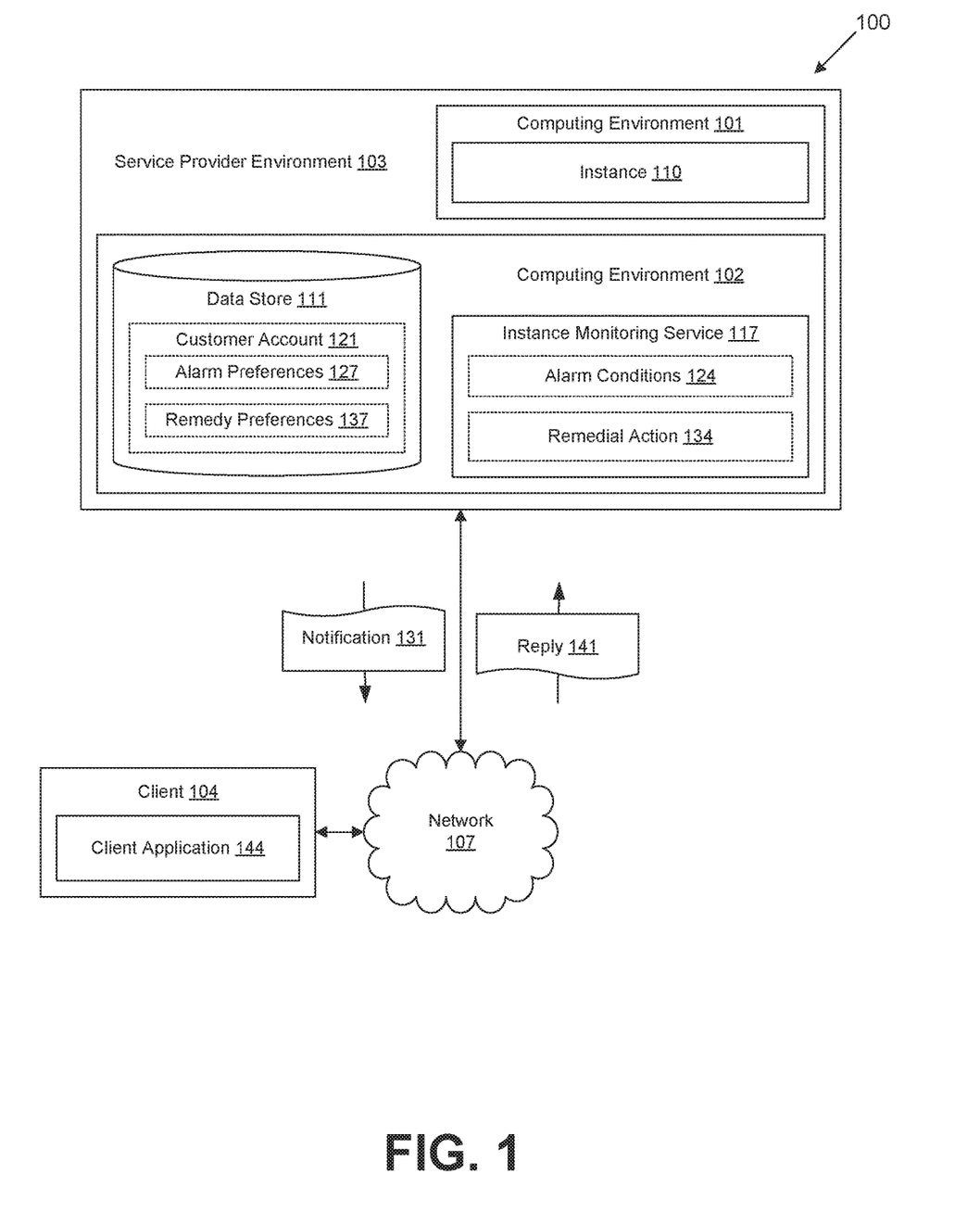
FIG. 1 is a drawing of a networked environment according to various embodiments of the present disclosure.

With reference to FIG. 1, shown is a networked environment 100 according to various embodiments. The networked environment 100 includes a computing environment 101 and a computing environment 102 within a service provider environment 103. The networked environment 100 further includes a client 104, which is in data communication with the service provider environment 103 via a network 107. The network 107 includes, for example, the Internet, intranets, extranets, wide area networks (WANs), local area networks (LANs), wired networks, wireless networks, or other suitable networks, etc., or any combination of two or more such networks.

The service provider environment 103 comprises one or more data centers, server banks, or other distribution of computing resources which facilitate the operations of the computing environments 101 or 102. The service provider environment 103 may further comprise a private or dedicated network to facilitate communications between the computing environments 101 and 102, or to facilitate communications within the respective computing environments 101 or 102.

The service provider environment 103 may also implement a control plane comprising a virtual layer of hardware and software components that handles control and management actions with respect to instances 110, such as provisioning, instantiating, launching, scaling, replication, etc. The control plane may include a Web services layer or tier, which can include at least one Web server, for example, along with computer-executable software, application servers, or other such components. The Web services layer also can include a set of Application Program Interfaces (APIs), or other such interfaces, for receiving Web services calls or requests from across the one network 107. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the components of the computing environments 101 and 102 to be discussed below, can be spread across multiple data centers in a region, for example, such that the servers are resilient to single data center failures.

The control plane may include at least one host monitoring component. The host monitoring component can comprise any appropriate combination of hardware and/or software including instructions for monitoring aspects of the computing environment 101 or 102. For example, the host monitoring component can include a dedicated host machine, process distributed across a number of machines, or a Web service, among other such options. A host monitoring component can access the information in the computing environment 101 to determine active instances 110, resource instances 110, or other such resources or components in the computing environment 101. A host monitoring component also can perform other tasks, such as collecting log and/or event information from multiple components of the control plane and/or computing environments 101 or 102, such as the Web service layer and various host managers. A monitoring component can constantly monitor the health of all the running repositories and/or instances 110 for the control plane and detect the failure of any of these instances 110. The computing environments 101 or 102 may comprise, for example, a server computer or any other system providing computing capability. Alternatively, the computing environments 101 or 102 may employ a plurality of computing devices that are arranged, for example, in one or more server banks or computer banks or other arrangements. Such computing devices may be located in a single installation or may be distributed among many different geographical locations. For example, the computing environments 101 or 102 may include a plurality of computing devices that together may comprise a cloud computing resource, a grid computing resource, and/or any other distributed computing arrangement. In some cases, the computing environments 101 or 102 may correspond to an elastic computing resource where the allotted capacity of processing, network, storage, or other computing-related resources may vary over time.

Various applications and/or other functionality may be executed in the computing environments 101 and 102 according to various embodiments. Also, various data is stored in a data store 111 that is accessible to the computing environment 102. The data store 111 may be representative of a plurality of data stores 111 as can be appreciated. The data stored in the data store 111, for example, is associated with the operation of the various applications and/or functional entities described below.

The components executed on the computing environment 101, for example, include instances 110, and other applications, services, processes, systems, engines, or functionality not discussed in detail herein. Instances 110 comprise virtualized instances of operating systems executed in the computing environment 101. The instances 110 may be associated with a customer account 121 which leases the computing resources of the computing environment 101 to facilitate the execution of the instance 110.

The components executed on the computing environment 102, for example, include an instance monitoring service 117, and other applications, services, processes, systems, engines, or functionality not discussed in detail herein. The instance monitoring service 117 is executed to determine if an executed instance 110 satisfies a condition embodied in an alarm condition 124 indicating a deviation in the operational health of a corresponding one of the instances 110. To this end, the instance monitoring service 117 may access monitoring data relating to the operational health of the instances from a host monitoring component of the control plane implemented in the service provider environment 103. The instance monitoring service 117 may also access monitoring data communicated by agents executed in the instances 110, or potentially other data, to determine if an alarm condition 124 is satisfied. The instance monitoring service 117 would then determine if criteria indicated in the alarm conditions 124 are satisfied based on the monitoring data.

Alarm conditions 124 may embody a variety of deviations in the operational health of an instance 110. For example, an alarm condition 124 may be satisfied by an idle instance 110. In some embodiments, the alarm condition 124 may comprise a usage rate of a computing resource exceeding a threshold. For example, the alarm condition 124 may comprise a central processing unit (CPU) usage rate or disk access rate aggregated over time exceeding a threshold, indicating that a process executed in the instance 110 may be stuck or otherwise malfunctioning. Other examples of computing resources may include network bandwidth, file system access, memory access, memory allocations, and other resources. Alarm conditions 124 may also embody other conditions indicating a deviation in the operational health of a instance 110 as can be appreciated.

Alarm conditions 124 may be applied to the entirety of the executed instances 110 or a subset of the instances 110. In some embodiments, the instances 110 to which an alarm condition 124 is applied may be determined by alarm preferences 127 of a customer account 121. The alarm conditions 124 may be defined in an Extensible Markup Language (XML) format, or another format as can be appreciated. Additionally, the alarm conditions 124 may be defined or generated by a customer associated with the instance 110, selected from a set of predefined alarm conditions 124, or generated by another approach.

In some embodiments, if a instance 110 satisfies an associated alarm condition 124, the instance monitoring service 117 may then communicate a notification 131 to a client 104 associated with a customer account 121 of the instance 110. The notification 131 may be communicated via the network 107 as a short message system (SMS) message, email message, as encoded in a network page served to the client 104, or by another approach.

If the instance 110 satisfies an associated alarm condition 124, the instance monitoring service 117 may then apply a remedial action 134 to the respective instance 110. A remedial action 134 comprises any function or operation applied in the service provider environment 103 to restore the operational health of an instance 110. Remedial actions 134 may comprise, for example, control plane interactions executed by the instance monitoring service 117 to affect an instance 110.

The remedial action 134 may comprise terminating the instance 110 or restarting the instance 110. The remedial action 134 may also comprise restarting the instance 110 such that it is executed in a different computing device or other component of the computing environment 101. The remedial action 134 may also comprise restarting or rebooting a computing device or other component of the computing environment 101 facilitating the execution of the instance 110. The remedial action 134 may also comprise other actions to restore the operational health of the instance 110.

In some embodiments, the remedial action 134 to be applied may be a specified default remedial action 134. In other embodiments, the remedial action 134 to be taken may be defined in remedy preferences 137 embodied in a customer account 121 associated with the respective instance 110. For example, the remedy preferences 137 may specify a remedial action 134 to be taken with respect to a particular instance 110 or alarm condition 124, or may exclude certain remedial actions 134 from being taken by the instance monitoring service 117. The remedy preferences 137 may also define a sequence or tier of remedial actions 134 to be taken in sequence until the alarm condition 124 is no longer satisfied. Remedial actions 134 to be taken as a function of remedy preferences 137 by another approach.

The remedial action 134 to be taken may also be determined as a function of the alarm condition 124 being satisfied. For example, an alarm condition 124 for excessive disk access by a instance 110, indicating a stuck process, may trigger a remedial action 134 to restart the instance. As another example, an alarm condition 124 for an idle instance 110 may trigger a termination of the instance 110. The remedial action 134 may also be determined as a function of the alarm condition 124 by other approaches.

The remedial action 134 to be taken may also be determined by a known operating condition of the computing environment 101. For example, if an alarm condition 124 is triggered for the instance 110 executed in a computing device known to be experiencing hardware difficulties, the instance monitoring service 117 may trigger a restart of the instance 110 in a different computing device of the computing environment 101. As another example, in a distributed computing environment 101, the instance monitoring service 117 may choose to restart the instance 110 in a new data center, server rack, availability zone, or other logical subdivision of the distributed computing environment 101. The remedial action 134 to be taken may also be defined by another approach.

In some embodiments, application of the remedial action 134 may be performed responsive to or delayed by a reply 141 to the notification 131 communicated to the instance monitoring service 117 by a client 104. For example, after communicating the notification 131, the instance monitoring service 117 may delay application of the remedial action 134 until receiving a reply 141 indicating that the remedial action 134 should be performed. As another example, the instance monitoring service 117 may cancel performance of the remedial action 134 if the reply 141 indicates that no remedial action 134 should be performed.

In further embodiments, a reply 141 may indicate that performance of the remedial action 134 should be suspended for a predefined duration. After expiration of the duration, the instance monitoring service 117 may then automatically perform the remedial action 134, communicate another notification 131 as described above, or perform some other action. Additionally, in some embodiments, the instance monitoring service 117 may automatically perform the remedial action 134 should no reply 141 be received within a predefined threshold. Actions taken by the instance monitoring service 117 after communicating the notification may be performed as a function of alarm preferences 127, remedy preferences 137, or by another approach.

The data stored in the data store 111 includes, for example, customer accounts 121 having alarm preferences 127 and remedy preferences 137, and potentially other data. Customer accounts 121 comprise data facilitating the purchase, lease, or rental of computing resources of the computing environment 101 to facilitate the execution of one or more instances 110. Customer accounts 121 may comprise, for example, payment processing information such as credit cards or bank accounts, customer identifiers such as a name, address, or contact information, and potentially other data. Customer accounts 121 may also be associated with permissions or other access control features which restrict which remedial actions 134 may be executed with respect to instances 110 associated with the customer account 121. Such permissions may be defined with respect to user accounts which facilitate interactions with the control plane, instances 110, or other components of the service provider environment 103.

Alarm preferences 127 associate one or more alarm conditions 124 with one or more of the instances 110 executed in associated with the customer account 121. The alarm conditions 124 associated with the instances 110 will then trigger remedial actions 134 when the instance 110 satisfies the associated one of the alarm conditions 124.

Remedy preferences 137 define how the instance monitoring service 117 should proceed in with applying remedial actions 134 to the instance 110 satisfying an alarm condition 124. The remedy preferences 137 may be defined with respect to the entirety of instances 110 associated with the customer account 121 or a subset of the associated instances 110. Remedy preferences 137 may define, for example, specific remedial actions 134 to be taken with respect to certain alarm conditions 124. Remedy preferences 137 may also define a tier or sequence of remedial actions 134 to be taken responsive to a satisfied alarm condition 124. Remedy preferences 137 may also define when a remedial action 134 is to be taken with respect to the communication of a notification 131, such as delaying performance of the remedial action 134 until a confirmation reply 141 is received, or automatically performing the remedial action 134 should no reply 141 be received. Remedy preferences 137 may also define other settings with respect to the application of remedial actions 134.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 144 and/or other applications. The client application 144 may be executed in a client 104, for example, to access network content served up by the computing environment 101 or 102 and/or other servers. To this end, the client application 144 may comprise, for example, a browser, a dedicated application, etc.

The client application 144 may be executed to access one or more APIs exposed by the service provider environment 103 to perform control plane interactions or other operations with respect to instances 110. For example, the client application 144 may comprise a Software Development Kit (SDK) or Command Line Interface (CLI) configured to access APIs which facilitate control plane interactions in the service provider environment 103. As another example, the client application 144 may comprise a browser or dedicated application executed to access a console or other user interface served by the service provider environment 103 to perform control plane interactions. Such a console may be embodied as a network page encoded for rendering by a browser client application 144, as data encoded for rendering by a dedicated client application 144. The client 104 may be configured to execute applications beyond the client application 144 such as, for example, email applications, social networking applications, word processors, spreadsheets, and/or other applications.

Next, a general description of the operation of the various components of the networked environment 100 is provided. To begin, a client 104 associated with a customer account 121 initiates the execution of one or more instances 110 in the computing environment 101. Initiating the instances 110 may be facilitated by a client application 144 or other functionality of the client 104. For example, a client application 144 may access an API or web service exposed by the service provider environment 103 to facilitate a control plane interaction which initiates an instance 110 in the computing environment 101.

The client 104 then associates one or more alarm conditions 124 with their associated instances 110. This may comprise defining the associations between alarm conditions 124 and instances 110 in alarm preferences 127. The alarm conditions 124 to be associated with the instances 110 may be selected from a collection of created alarm conditions 124. Such alarm conditions 124 may be predefined alarm conditions 124, or alarm conditions 124 defined by other customers or users of the service provider environment 103 for association with a respective instance 110. The alarm conditions 124 may be generated as a function of input from the client 104, user preferences, or other data.

In some embodiments, the instance monitoring service 117 may require that user account associated with a customer account 121 has sufficient privileges to associate the alarm condition 124 with the respective instance 110.

Additionally, the client 104 may create or modify remedy preferences 137 defining how remedial actions 134 should be performed with respect to the instance 110 satisfying an alarm condition 124. This may comprise defining a default remedial action 134 to be taken, specifying which remedial actions 134 should be taken with respect to an alarm condition 124, defining tiers or sequences of remedial actions 134 to be taken, or other data.

For example, in some embodiments, remedy preferences 137 may indicate multiple remedial actions 134 to be taken in response to an alarm condition 124. The remedy preferences 137 may be defined in input from a client 104, or by another approach. A workflow engine or other component executed in the service provider environment 103 may then parse the remedy preferences 137 to execute the indicated remedial actions 134.

In some embodiments, the instance monitoring service 117 may determine if a user account such as one associated with the customer account 121 has sufficient permissions to perform a specified remedial action 134. In embodiments in which the user account lacks sufficient permissions to perform a remedial action 134, the instance monitoring service 117 may prompt the client 104 to select another remedial action 134, notify the client 104 of the lack of permissions to execute the remedial action 134 but continue to associate the remedial action 134 with the alarm condition 124, or perform another action.

In embodiments in which a notification 131 is to be communicated to a client 104 responsive to a satisfied alarm condition 124, defining the remedy preferences 137 may comprise defining whether a remedial action 134 should be taken responsive to a reply 141 confirming the remedial action 134, after a predefined duration after communicating the notification 131, or other actions with respect to a notification 131.

In some embodiments, the instance monitoring service 117 may encode for rendering by a client 104 a user interface to facilitate the generation or modification of alarm conditions 124, alarm preferences 127, or remedy preferences 137. In other embodiments, the instance monitoring service 117 may expose or otherwise make accessible to a client 104 via a client application 144 an application program interface, web service, or other functionality to facilitate the generation or modification of alarm conditions 124, alarm preferences 127, or remedy preferences 137. Generating or modifying alarm conditions 124, alarm preferences 127, or remedy preferences 137 may be facilitated by uploading data embodying alarm conditions 124, alarm preferences 127, or remedy preferences 137 as formatted in XML, in another markup language or format, or by another approach. Generating or modifying alarm conditions 124, alarm preferences 127, remedy preferences 137 may also be performed by another approach.

Next, during the execution of the instance 110, the instance monitoring service 117 accesses monitoring data indicating the operational health of instances 110. Such monitoring data may be obtained from a host monitoring component of the control plane executed in the service provider environment 103. Such monitoring data may also be obtained from agents or other processes executed in the instance 110 in communication with the instance monitoring service 117. The monitoring data may also be obtained by another approach.

The instance monitoring service 117 then detects a deviation in the operational health of the instance 110 which satisfies an associated alarm condition 124. This may comprise, for example, the instance 110 being idle for a predefined duration, the instance 110 performing CPU, disk access, network 107 operations, or other usage of computing resources of the computing environment 101 at a rate exceeding a threshold. This may also comprise some other criteria defined in the alarm condition 124 embodying a deviation in the operational health of the instance 110.

After the alarm condition 124 has been satisfied, the instance monitoring service 117 may then communicate a notification 131 to a client 104 associated with a customer account 121 for the instance 110. This may comprise communicating an SMS message, email message, encoding the notification 131 in a network page rendered by a client application 144, or some other approach. The notification 131 may indicate that the alarm condition 124 has been satisfied. The notification 131 may also solicit the client 104 for an approval to apply a remedial action 134 with respect to the instance 117. The notification 131 may also solicit the client 104 for a cancellation of any application of a remedial action 134. The notification 131 may further facilitate a delaying of the remedial action 134 for a predefined duration, after which the instance monitoring service 117 may communicate a subsequent notification 131, automatically perform a remedial action 134, or take some other action. Notifications 131 may also be communicated to a client 104 by other approaches.

The instance monitoring service 117 then determines a remedial action 134 to apply with respect to the instance 110 satisfying the alarm condition 124. The remedial action 134 to be taken may be a default remedial action 134 as defined by the instance monitoring service 117. In some embodiments, the remedial action 134 is determined as a function of remedy preferences 137. For example, the remedy preferences 137 may specify a remedial action 134 with respect to the satisfied alarm condition 124. As another example, the remedy preferences 137 may establish a sequence of remedial actions 134 to be taken until the instance 110 no longer satisfies the alarm condition 124. The remedial action 134 to be taken may also be determined as a function of the remedy preferences 137 by another approach.

In some embodiments, the remedial action 134 may be determined by the instance monitoring service 117 as a function of the satisfied alarm condition 124. For example, the instance monitoring service 117 may define certain remedial actions 134 to be performed with respect to certain alarm conditions 124. For example, an alarm condition 124 defining the instance 110 having a CPU usage rate over a threshold, thereby indicating a stuck or malfunctioning process, may select a remedial action 134 to restart the instance 110. As another example, an alarm condition 124 defining a instance 110 being idle for a predefined duration may select a remedial action 134 to terminate the idle instance 110.

In some embodiments, an alarm condition 124 may be associated with a severity level from which the remedial action 134 may be determined. For example, an alarm condition 124 having a low severity level may indicate that the instance 110 may still operate, but at an impaired level or at risk of worsening its operational health. In such an example, the remedial action 134 may comprise taking a backup, state snapshot, or other reproducible instance of the instance 110 from which the instance 110 may be restored if necessary. Remedial actions 134 may also be determined by severity levels by another approach.

Additionally, in some embodiments, the remedial action 134 may be determined by the operational condition of the components of the computing environment 101. For example, if a computing device or other component which facilitates the execution of the instance 110 is known to be malfunctioning by the instance monitoring service 117, the remedial action 134 may terminate the instance 110 and restart the instance in a different computing device of the computing environment 101. As another example, in embodiments in which the computing environment 101 comprises a distributed computing environment 101, the instance monitoring service 117 may select a remedial action 134 to terminate and restart the instance 110 in a new data center, availability zone, region, or other component of a distributed computing environment 101.

In some embodiments, after the remedial action 134 has been determined, the instance monitoring service 117 may automatically initiate an application of the remedial action 134. In other embodiments in which a notification 131 was communicated to a client 104, the instance monitoring service 117 may apply the remedial action 134 responsive to obtaining a reply 141 from the client 104 approving the remedial action 134. The instance monitoring service 117 may also cancel performance of a remedial action 134 responsive to a reply 141 indicating that no remedial action 134 should be taken, allowing the instance 110 to continue operation. In further embodiments, the instance monitoring service 117 may automatically apply the remedial action 134 after the expiration of a duration defined with respect to the time at which the notification 131 was sent.

In some embodiments, prior to applying the remedial action 134, the instance monitoring service 117 may determine if a customer account 121 associated with the affected instance 110 has sufficient permissions for the remedial action 134. Should the customer account 121 lack sufficient permissions for the remedial action 134, the instance monitoring service 117 may select another remedial action 134 as was discussed above. In another embodiment, the instance monitoring service 117 may apply no remedial actions 134, apply a default remedial action 134, or apply another remedial action 134. The instance monitoring service 117 may also communicate a notification 131 to a client 104 associated with the customer account 121 indicating the lack of permissions. Other actions may also be taken in response to a customer account 121 lacking permissions to execute a specified remedial action 134.

Applying the remedial action 134 may be facilitated by a workflow engine or other application or service executed in the service provider environment 103 to facilitate applications of remedial actions 134. Applying a remedial action 134 may comprise executing one or more defined control plane interactions affecting a corresponding instance 110. The remedial action 134 may also be applied by another approach.

Figure 2:
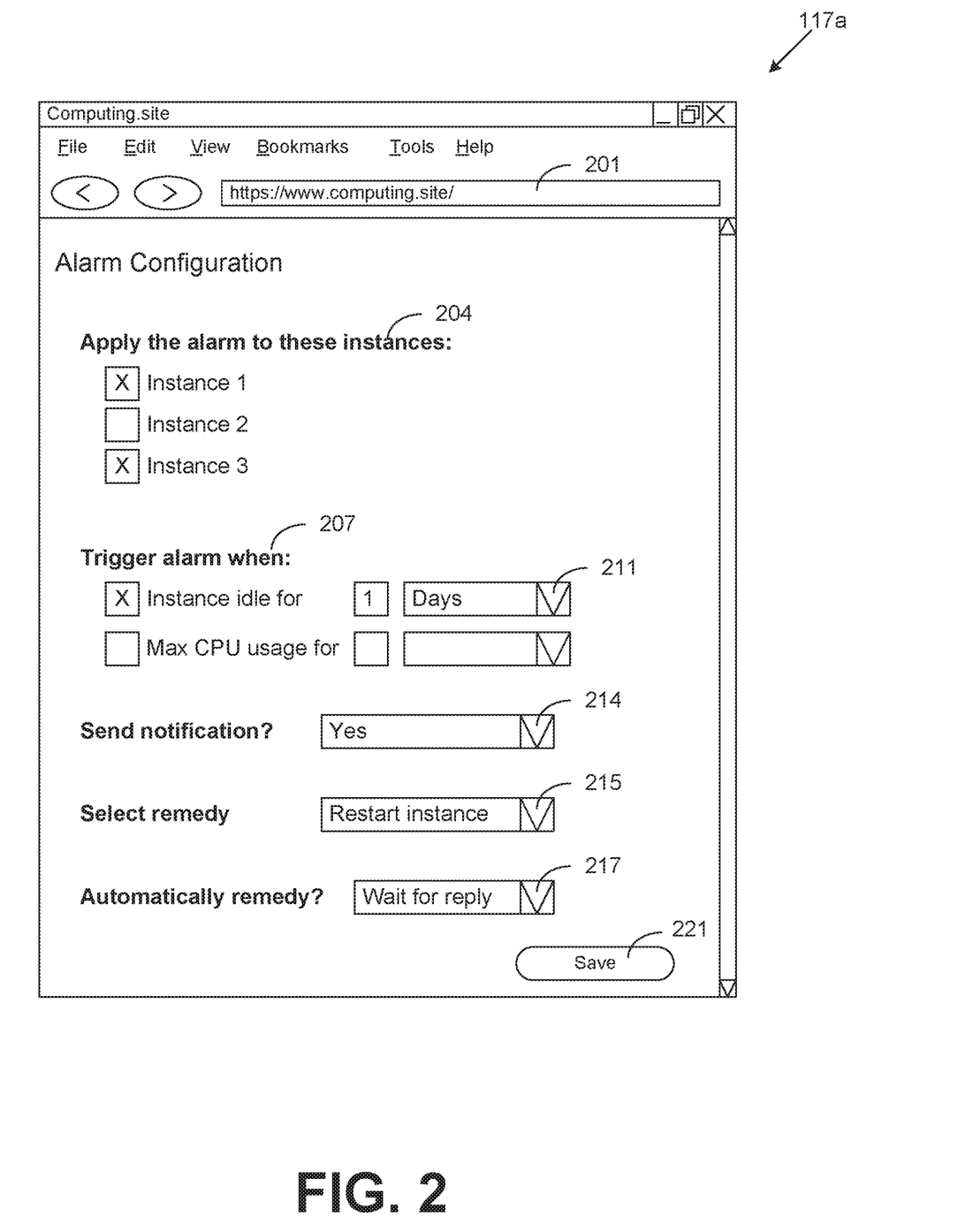
FIG. 2 is a drawing of an example of a user interface rendered by a client in the networked environment of FIG. 1 according to various embodiments of the present disclosure.

Referring next to FIG. 2, shown is a user interface 117a generated by the instance monitoring service 117 (FIG. 1) that facilitates the creation of alarm conditions 124 (FIG. 1), alarm preferences 127 (FIG. 1), and remedy preferences 137 (FIG. 1). In some embodiments, the user interface depicted in FIG. 2 is encoded as a network page served by the computing environment 102 (FIG. 1) to a client 104 (FIG. 1) via the network 107 (FIG. 1) for rendering by a browser client application 144 (FIG. 1). In other embodiments, the user interface depicted in FIG. 2 is encoded as data for rendering by a dedicated client application 144.

Item 201 is a uniform resource locator (URL) directing the client application 144 to a network page served by the computing environment 102. Item 204 is an area for a client 104 to input a selection of instances 110 (FIG. 1) for which a generated alarm condition 124 will be associated. Item 207 is an input to define criteria to be embodied in a generated alarm condition 124. In this embodiment, the input allows for a selection of various criteria to be considered by the alarm condition 124 and an input for variable thresholds of the alarm condition 124 in item 211.

Item 214 is an input for a selection as to whether a notification 131 (FIG. 1) will be communicated to the client 104 responsive to the generated alarm condition 124 being satisfied by an associated instance 110. Item 215 is an input for selecting one of a list of remedial actions 134 (FIG. 1) to be applied to the instance 110 after the alarm condition 124 has been satisfied. Item 217 is an input for generating alarm preferences 127 defining when a remedial action 134 will be performed. In this embodiment, the remedial action 134 will be initiated after a reply 141 (FIG. 1) confirming the performance of the remedial action 134. Item 221 is a button which, when clicked, saves the alarm condition 124, alarm preferences 127, and remedy preferences 137 such that the selected instances 110 are associated with a generated alarm condition 124.

Figure 3:
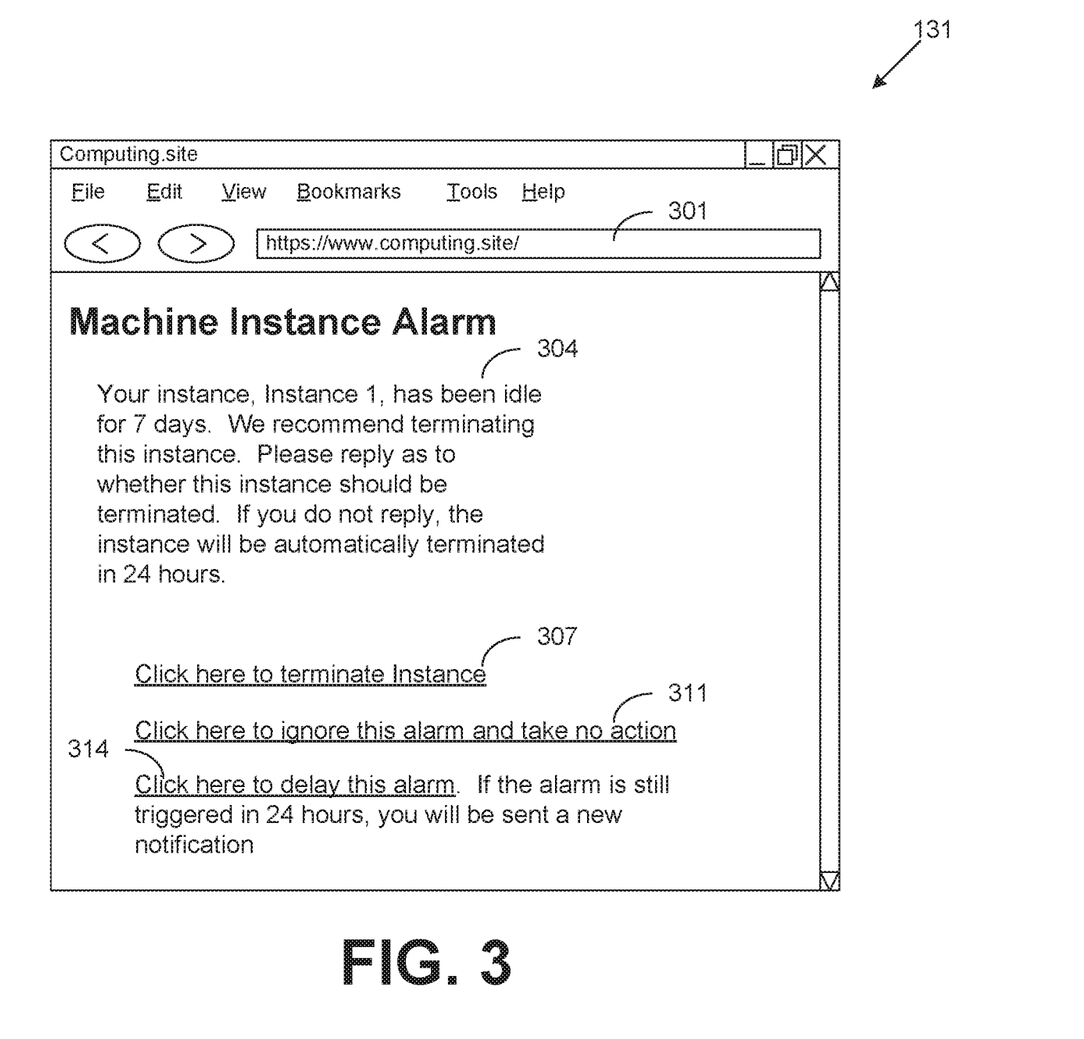
FIG. 3 is a drawing of an example of a user interface rendered by a client in the networked environment of FIG. 1 according to various embodiments of the present disclosure.

Moving on to FIG. 3, shown is a user interface embodying a notification 131 (FIG. 1) communicated to a client 104 (FIG. 1) according to an embodiment of the present disclosure. In some embodiments, the user interface depicted in FIG. 3 is encoded as a network page served by the computing environment 102 (FIG. 1) to a client 104 via the network 107 (FIG. 1) for rendering by a browser client application 144 (FIG. 1). In other embodiments, the user interface depicted in FIG. 3 is encoded as data for rendering by a dedicated client application 144.

Item 301 is a URL directed to a network site served by the computing environment 102. Item 304 is a text description of the instance 110 (FIG. 1) associated with the client 104 satisfying an alarm condition 124 (FIG. 1). Item 307 is a link which, when clicked, confirms that a remedial action 134 (FIG. 1) should be performed with respect to the affected instance 110. Item 311 is a link which, when clicked, cancels an application of a remedial action 134, allowing the instance 110 to continue operating in the alarm condition 124. Item 314 is a link which, when clicked, suspends an application of a remedial action 134, and generates a subsequent notification 131 after a twenty-four hour period.

Figure 4:
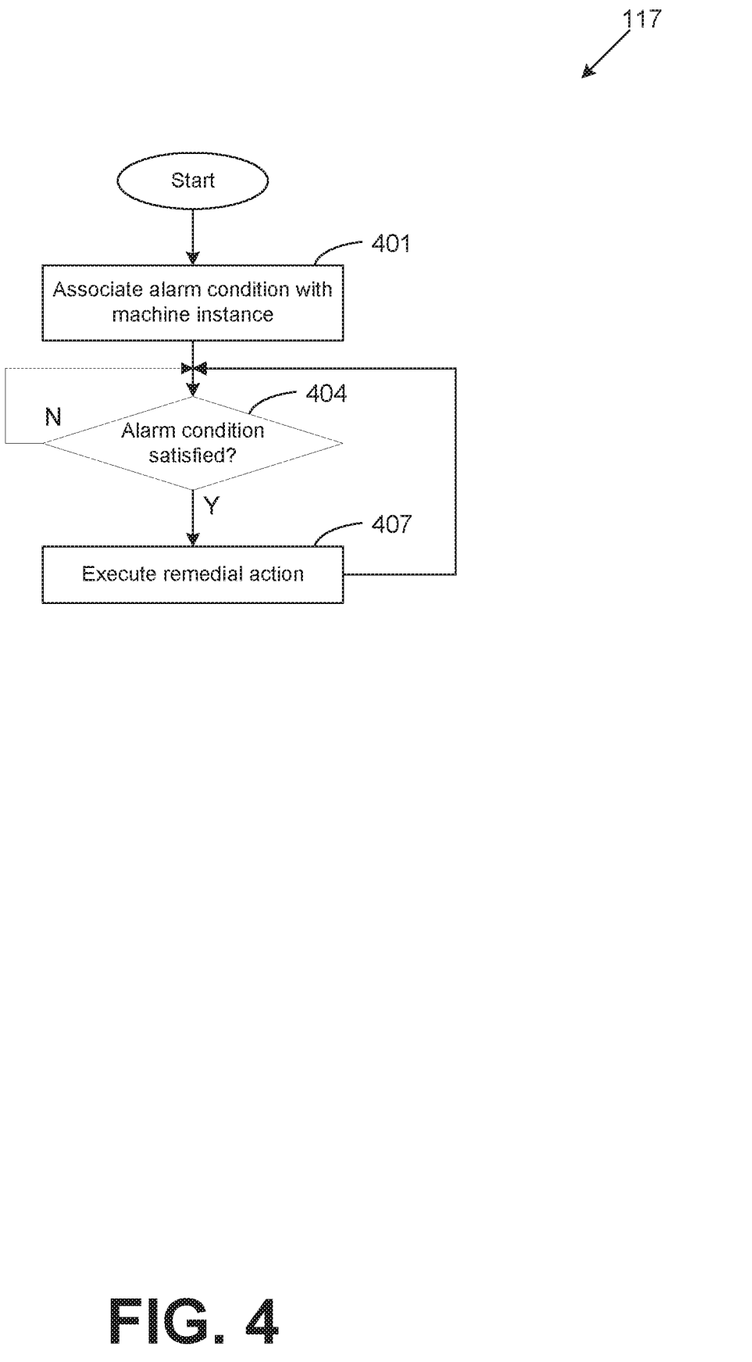
FIG. 4 is a flowchart illustrating one example of functionality implemented as portions of instance monitoring service executed in a computing environment in the networked environment of FIG. 1 according to various embodiments of the present disclosure.

Turning now to FIG. 4, shown is a flowchart that provides one example of the operation of a portion of the instance monitoring service 117 (FIG. 1) according to various embodiments. It is understood that the flowchart of FIG. 4 provides merely an example of the many different types of functional arrangements that may be employed to implement the operation of the portion of the instance monitoring service 117 as described herein. As an alternative, the flowchart of FIG. 4 may be viewed as depicting an example of steps of a method implemented in the computing environment 102 (FIG. 1) according to one or more embodiments.

Beginning with box 401, the instance monitoring service 117 associates an alarm condition 124 (FIG. 1) with the instance 110 (FIG. 1). In some embodiments, the alarm condition 124 is associated with the instance 110 responsive to an input from a client 104 (FIG. 1) associated with the instance 110. For example, an input to a user interface rendered by a client application 144 (FIG. 1) may facilitate the creation and association of alarm conditions 124. As another example, the client application 144 may communicate data embodying an alarm condition 124 which is encoded in a format understood by the instance monitoring service 117, such as XML or another format. Associating an alarm condition 124 with a instance 110 may comprise saving data embodied as an alarm preference 127 (FIG. 1) in a data store 111 (FIG. 1) or by another approach.

In box 404, the instance monitoring service 117 waits monitors the operational health of the instance 110 until the alarm condition 124 is satisfied. This may comprise, for example, obtaining monitoring data from a host monitoring component of a control plane executed in the service provider environment 103 (FIG. 1) and comparing the monitoring data to criteria embodied in alarm conditions 124. Monitoring the operational health of the instance 110 may also be performed by another approach.

Once the alarm condition 124 is satisfied, then the instance monitoring service 117 applies a remedial action 134 (FIG. 1) to restore the operational health of the instance 110 in box 407. This may comprise, for example, the instance monitoring service 117 performing one or more control plane interactions embodied in the remedial action 134. This may be facilitated by an API, web service, or other functionality of the control plane which is accessible to the instance monitoring service 117. Applying the remedial action 134 may also be performed by another approach.

After applying the remedial action 134, the process returns to box 404, where the instance monitoring service 117 continues to monitor the operational health of the instance 110.

Figure 5:
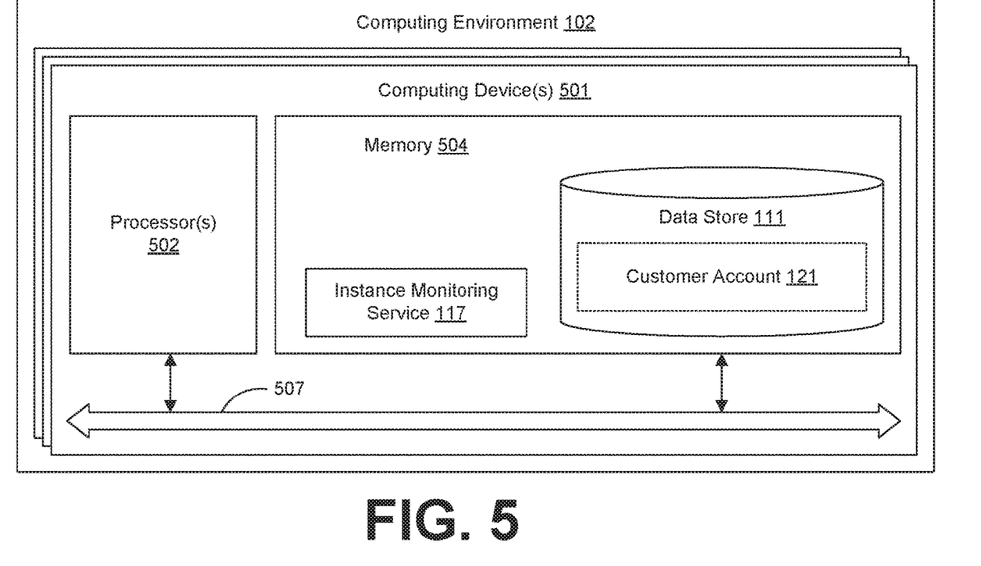
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 102 according to an embodiment of the present disclosure. The computing environment 102 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are instances, an instance monitoring service 117, and potentially other applications. Also stored in the memory 504 may be a data store 111 storing customer accounts 121 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the instance monitoring service 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 4 show the functionality and operation of an implementation of portions of the instance monitoring service 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including an instance monitoring service 117, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:
1. A computer-implemented method, comprising:
obtaining information that specifies an alarm condition of a set of resources and an action to initiate in response to satisfaction of the alarm condition;

obtaining utilization information of the set of resources that indicates that the alarm condition has been satisfied;

generating a determination to perform the action based at least in part on the utilization information;

transmitting a request to perform the action to a resource of the set of resources, where performance of the action modifies an attribute of the resource; and transmitting a second request to perform a second action, the second action comprising terminating the resource.

2. The computer-implemented method of claim 1, wherein the action further comprises allocating additional resources to the set of resources.

3. The computer-implemented method of claim 2, wherein allocating the additional resources further comprises allocating additional storage space to an instance, the instance being a member of the set of resources.

4. The computer-implemented method of claim 1, wherein transmitting the request further comprises generating a web service call to an interface of a service of a computing resource service provider, the service managing at least one resource of the set of resources.

5. The computer-implemented method of claim 1, wherein transmitting the request further comprises:
verifying a user identity associated with the request; and
as a result of verifying the user identity, obtaining a permission associated with the user identity to include in the request, the permission providing authorization to execute the action.

6. The computer-implemented method of claim 1, wherein the computer-implemented method further comprises:
causing a user interface to be updated with information indicating the utilization information and a set of actions, where the action and the second action are members of the set of actions; and
obtaining an indication to perform the action or the second action based at least in part on an interaction with the user interface.

7. A system, comprising:
one or more processors; and
memory that stores executable instructions that, as a result of being executed by the one or more processors, cause the system to:
receive information indicating a condition associated with a set of resources that, as a result of being satisfied, causes performance of an operation that modifies at least one resource of the set of resources;
generate a determination, based at least in part on utilization information obtained from the set of resources, that the condition has been met; and
cause a resource of the set of resources to be modified in accordance with the operation as a result of generating the determination by at least causing the resource of the set of resources to be restarted.

8. The system of claim 7, wherein the memory further stores executable instructions that, as a result of being executed by the one or more processors, cause the system to cause a decider node to be instantiated, the decider node responsible for performance of the operation.

9. The system of claim 7, wherein the operation that modifies the at least one resource of the set of resources includes at least one of: provisioning additional resources to the set of resources, instantiating an instance to be a member of the set of resources, and replicating a resource of the set of resources.

10. The system of claim 7, wherein the information includes a workflow that indicates a set of actions to be performed by a workflow engine to execute the operation that modifies the set of resources.

11. The system of claim 7, wherein the executable instructions that cause the system to cause the set of resources to be modified further include executable instructions that, as a result of being executed by the one or more processors, cause the system to generate an Application Programming Interface (API) call indicating a sequence of actions to execute the operation that modifies the set of resources.

12. The system of claim 7, wherein the executable instructions that cause the system to cause the at least one resource of the set of resources to be modified further include executable instructions that, as a result of being executed by the one or more processors, cause the system to cause a disk connected to the resource to be connected to the at least one resource after the least one resource has been restarted.

13. The system of claim 12, wherein the memory further stores executable instructions that, as a result of being executed by the one or more processors, cause the system to:
transmit a notification to a customer account associated with the set of resources indicating that the condition is satisfied; and
suspend performance of the operation that modifies the at least one resource of the set of resources as a result of receiving a request to delay the operation in response to the notification.

14. The system of claim 7, wherein the utilization information indicates disk access of the resource exceeds a value relative to a threshold.

15. A non-transitory computer-readable storage medium storing thereon executable instructions that, as a result of being executed by one or more processors of a computer system, cause the computer system to at least:
generate an alarm condition based at least in part on an alarm preference of a customer account indicating an event associated with a set of resources;
determine occurrence of the event based at least in part on utilization information obtained from a first resource of the set of resources;
determine a set of operations to perform in response to the occurrence of the event based at least in part on a remedy preference of the customer account; and
cause a first operation of the set of operations to be performed, where execution of the first operation causes additional resources to be allocated to at least one resource of the set of resources and causes the at least one resource of the set of resources to be restarted.

16. The non-transitory computer-readable storage medium of claim 15, wherein the executable instructions that cause the computer system to cause the first operation to be performed further include executable instructions that, as a result of being executed by one or more processors, cause the computer system to generate a web service call to a service of a computing resource service provider managing at least one resource of the set of resources.

17. The non-transitory computer-readable storage medium of claim 15, wherein the set of operations further comprises tiers of remedial actions.

18. The non-transitory computer-readable storage medium of claim 15, wherein the executable instructions that cause the computer system to cause the first operation to be performed further include executable instructions that, as a result of being executed by one or more processors, cause the computer system to:

determine completion of the first operation; and as a result, cause a second operation to be performed.

19. The non-transitory computer-readable storage medium of claim 18, wherein the second operation is indicated in a sequence of operations defined in the remedy preference.

20. The non-transitory computer-readable storage medium of claim 15, wherein the memory further includes instructions that, as a result of being executed by one or more processors of a computer system, cause the computer system to obtain the alarm preference in response to an interaction with an access console associated with the customer account.

* * * * *